United States Patent
Yuan et al.

(10) Patent No.: US 11,676,385 B1
(45) Date of Patent: Jun. 13, 2023

(54) PROCESSING METHOD AND APPARATUS, TERMINAL DEVICE AND MEDIUM

(71) Applicant: LEMON INC., Grand Cayman (KY)

(72) Inventors: Ye Yuan, Los Angeles, CA (US); Yufei Wang, Los Angeles, CA (US); Longyin Wen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/816,990

(22) Filed: Aug. 2, 2022

(30) Foreign Application Priority Data

Apr. 7, 2022 (CN) .......................... 202210365435.0

(51) Int. Cl.
G06K 9/00 (2022.01)
G06V 20/40 (2022.01)
G06V 10/46 (2022.01)
G06V 20/62 (2022.01)

(52) U.S. Cl.
CPC ............ *G06V 20/46* (2022.01); *G06V 10/462* (2022.01); *G06V 20/635* (2022.01)

(58) Field of Classification Search
None
See application file for complete search history.

(56) References Cited

U.S. PATENT DOCUMENTS

| | | | | |
|---|---|---|---|---|
| 6,990,496 B1* | 1/2006 | McGee, III | ......... | G06F 16/7844 707/999.102 |
| 7,333,712 B2* | 2/2008 | Jeannin | ................ | G11B 27/105 |
| 7,334,186 B2* | 2/2008 | Wu | .................. | H04N 21/42202 386/E9.041 |
| 7,672,510 B2* | 3/2010 | Nagaoka | ............... | B60R 21/013 382/104 |
| 8,238,672 B2* | 8/2012 | Choi | .................. | G06F 16/7847 345/440 |
| 9,247,225 B2* | 1/2016 | Yehezkel | ................ | G06F 16/78 |
| 9,552,520 B1* | 1/2017 | Smolic | ................... | G06V 20/46 |
| 9,620,168 B1* | 4/2017 | Townsend | ................ | G06T 7/90 |
| 9,736,349 B2* | 8/2017 | Yang | ....................... | H04N 23/61 |

(Continued)

FOREIGN PATENT DOCUMENTS

CN 104063883 A 9/2014
CN 110119757 A 8/2019
(Continued)

OTHER PUBLICATIONS

Tsoneva et al., "Automated summarization of narrative video on a semantic level," International Conference on Semantic Computing (ICSC 2007), 2007, pp. 169-176, doi: 10.1109/ICSC.2007.42. (Year: 2007).*

(Continued)

*Primary Examiner* — Feng Niu
(74) *Attorney, Agent, or Firm* — Faegre Drinker Biddle & Reath LLP

(57) ABSTRACT

A target video and video description information corresponding to the target video are acquired; salient object information of the target video is determined; a key frame category of the video description information is determined; and the target video, the video description information, the salient object information and the key frame category are input into a processing model to obtain a timestamp of an image corresponding to the video description information in the target video.

14 Claims, 4 Drawing Sheets

(56) References Cited

U.S. PATENT DOCUMENTS

| | | | | |
|---|---|---|---|---|
| 9,740,941 | B2* | 8/2017 | Bae | G06V 20/52 |
| 10,007,848 | B2* | 6/2018 | Zhang | H04N 5/44504 |
| 10,157,318 | B2* | 12/2018 | Smolic | G11B 27/34 |
| 10,580,453 | B1* | 3/2020 | Townsend | G06T 7/90 |
| 10,643,264 | B2* | 5/2020 | Jones | G06Q 30/0643 |
| 10,650,245 | B2* | 5/2020 | Swaminathan | H04N 21/8549 |
| 10,721,431 | B2* | 7/2020 | Ahmann | H04N 21/4223 |
| 10,803,319 | B2* | 10/2020 | Yoo | G06V 10/764 |
| 11,106,916 | B2* | 8/2021 | Latham | H04N 21/8455 |
| 11,126,855 | B2* | 9/2021 | Kim | G06V 20/20 |
| 11,178,446 | B2* | 11/2021 | Kiryanov | H04N 21/6332 |
| 11,367,282 | B2* | 6/2022 | Wang | H04N 21/44 |
| 2003/0152363 | A1* | 8/2003 | Jeannin | H04N 21/8549 |
| 2004/0221227 | A1* | 11/2004 | Wu | H04N 9/8233 |
| | | | | 386/E9.041 |
| 2004/0263621 | A1* | 12/2004 | Guo | G08B 13/19663 |
| | | | | 348/143 |
| 2007/0046669 | A1* | 3/2007 | Choi | G11B 27/28 |
| 2008/0186381 | A1* | 8/2008 | Guo | H04N 7/188 |
| | | | | 348/143 |
| 2014/0086554 | A1* | 3/2014 | Yehezkel | H04N 21/278 |
| | | | | 386/E9.011 |
| 2015/0278605 | A1* | 10/2015 | Seo | G06V 20/40 |
| | | | | 382/195 |
| 2016/0117827 | A1* | 4/2016 | Bae | G06V 20/52 |
| | | | | 382/103 |
| 2016/0364883 | A1* | 12/2016 | Shiiyama | H04N 5/262 |
| 2017/0011264 | A1* | 1/2017 | Smolic | G11B 27/105 |
| 2017/0091558 | A1* | 3/2017 | Smolic | G11B 27/28 |
| 2017/0270965 | A1* | 9/2017 | Bao | G06F 40/30 |
| 2018/0025405 | A1* | 1/2018 | Jones | G06Q 30/0643 |
| | | | | 705/26.7 |
| 2018/0082124 | A1* | 3/2018 | Zhang | G06V 20/46 |
| 2018/0352186 | A1* | 12/2018 | Ahmann | G06T 7/70 |
| 2019/0019036 | A1* | 1/2019 | Yoo | G06N 3/044 |
| 2019/0114486 | A1* | 4/2019 | Wang | G06V 20/46 |
| 2019/0377955 | A1* | 12/2019 | Swaminathan | G06V 10/764 |
| 2020/0117910 | A1* | 4/2020 | Willomitzer | H04N 21/41265 |
| 2020/0396411 | A1* | 12/2020 | Hattori | G06T 7/70 |
| 2020/0401808 | A1* | 12/2020 | Wu | G06V 10/764 |
| 2020/0404173 | A1* | 12/2020 | Li | G06V 20/46 |
| 2021/0042530 | A1* | 2/2021 | Kim | G06V 20/20 |
| 2021/0056311 | A1* | 2/2021 | Latham | H04N 21/8405 |
| 2021/0144418 | A1* | 5/2021 | Han | H04N 21/251 |
| 2021/0281906 | A1* | 9/2021 | Kiryanov | H04N 21/43615 |
| 2021/0319809 | A1* | 10/2021 | Lin | G10L 21/0208 |
| 2021/0392394 | A1* | 12/2021 | Li | H04N 21/47205 |
| 2022/0172005 | A1* | 6/2022 | Coviello | G06N 3/006 |
| 2022/0172476 | A1* | 6/2022 | Li | G06V 20/48 |
| 2022/0199121 | A1* | 6/2022 | Jiang | H04N 21/41407 |
| 2022/0207874 | A1* | 6/2022 | Stenger | G06V 10/764 |
| 2022/0277566 | A1* | 9/2022 | Yang | G06V 10/762 |
| 2022/0291823 | A1* | 9/2022 | Siddanahalli Ninge Gowda | G06V 20/30 |

FOREIGN PATENT DOCUMENTS

| | | |
|---|---|---|
| CN | 110213614 A | 9/2019 |
| CN | 110795595 A | 2/2020 |
| CN | 111523566 A | 8/2020 |
| CN | 113259780 A | 8/2021 |
| CN | 113779303 A | 12/2021 |
| CN | 113784171 A | 12/2021 |
| WO | 2016180308 A1 | 11/2016 |
| WO | 2020182078 A1 | 9/2020 |

OTHER PUBLICATIONS

Li et al., "Movie Summarization Based on Alignment of Plot and Shots," 2017 IEEE 31st International Conference on Advanced Information Networking and Applications (AINA), 2017, pp. 189-196, doi: 10.1109/AINA.2017.127. (Year: 2017).*

Mademlis et al., "Multimodal Stereoscopic Movie Summarization Conforming to Narrative Characteristics," in IEEE Transactions on Image Processing, vol. 25, No. 12, pp. 5828-5840, Dec. 2016, doi: 10.1109/TIP.2016.2615289. (Year: 2016).*

Zhu et al., "Hierarchical video summarization for medical data." In Storage and Retrieval for Media Databases 2002, vol. 4676, pp. 395-406. SPIE, 2001. (Year: 2001).*

Morere et al., "Co-regularized deep representations for video summarization," 2015 IEEE International Conference on Image Processing (ICIP), 2015, pp. 3165-3169, doi: 10.1109/ICIP.2015.7351387. (Year: 2015).*

Roig Ripoll, "Multimodal 2DCNN action recognition from RGB-D data with video summarization." Master's thesis, Universitat Politècnica de Catalunya, 2017. (Year: 2017).*

Yang et al., "Background-Click Supervision for Temporal Action Localization," in IEEE Transactions on Pattern Analysis and Machine Intelligence, Dec. 2, 2021, doi: 10.1109/TPAMI.2021.3132058. (Year: 2021).*

First Chinese Office Action dated Apr. 18, 2023 for Chinese Application No. 202210365435.0, with English translation (12 pages).

First Chinese Search Report dated Apr. 7, 2023 for Chinese Application No. 202210365435.0, with English translation (10 pages).

Suvarna Nandyal et al., "An Efficient Umpire Key Frame Segmentation in Cricket Video using HOG and SVM," 2021 6th International Conference for Convergence in Technology (I2CT), Pune, India, Apr. 2-4, 2021, pp. 1-7.

Li Jing, "Research on Image/Video Retrieval and Authentication Technology Based on Semantics and Interests," Full-text Database of Excellent Doctoral Dissertations in China, Jun. 15, 2021 (English Abstract only).

* cited by examiner

PROCESSING METHOD AND APPARATUS, TERMINAL DEVICE AND MEDIUM

CROSS-REFERENCE TO RELATED APPLICATION(S)

This application claims priority to Chinese Patent Application No. 202210365435.0 filed Apr. 7, 2022, the disclosure of which is incorporated herein by reference in its entirety.

TECHNICAL FIELD

Embodiments of the present disclosure relate to the field of computer technologies, in particular, a processing method and apparatus, a terminal device and a medium.

BACKGROUND

Video structuration refers to the task of extracting and presenting valuable information in a video so as to improve the efficiency of video information acquisition. For example, video highlight extraction and moment localization refer to extracting a short highlight clip or a video frame from a video to summarize important information of the video.

The current technologies for video highlight extraction and moment localization mainly analyze the visual features in the video, leading to poor accuracy of the determined highlight frame.

SUMMARY

Embodiments of the present disclosure provide a processing method and apparatus, a terminal device and a medium, so that the accuracy of determining the highlight frame is improved.

In a first aspect, an embodiment of the present disclosure provides a processing method. The processing method includes steps described below.

A target video and video description information corresponding to the target video are acquired.

Salient object information of the target video is determined.

A key frame category of the video description information is determined.

The target video, the video description information, the salient object information and the key frame category are input into a processing model to obtain a timestamp of an image corresponding to the video description information in the target video.

In a second aspect, an embodiment of the present disclosure further provides a processing apparatus. The processing apparatus includes an acquisition module, a first determination module, a second determination module and an input module.

The acquisition module is configured to acquire a target video and video description information corresponding to the target video.

The first determination module is configured to determine salient object information of the target video.

The second determination module is configured to determine a key frame category of the video description information.

The input module is configured to input the target video, the video description information, the salient object information and the key frame category into a processing model to obtain a timestamp of an image corresponding to the video description information in the target video.

In a third aspect, an embodiment of the present disclosure further provides a terminal device. The terminal device includes one or more processors and a storage apparatus configured to store one or more programs.

The one or more programs, when executed by the one or more processors, cause the one or more processors to implement the processing method of the embodiment of the present disclosure.

In a fourth aspect, an embodiment of the present disclosure further provides a computer-readable storage medium storing a computer program which, when executed by a processor, implements the processing method of the embodiment of the present disclosure.

The embodiments of the present disclosure provide a processing method and apparatus, a terminal device and a medium. The method includes steps described below. A target video and video description information corresponding to the target video are acquired; salient object information of the target video is determined; a key frame category of the video description information is determined; and the target video, the video description information, the salient object information and the key frame category are input into a processing model to obtain a timestamp of an image corresponding to the video description information in the target video. Through the preceding technical solution, the salient object information and the key frame category can be determined according to the target video, so that the processing of the video is assisted in through the salient object information and the key frame category, and the accuracy of the output timestamp is improved after the video description information and the target video are input into the processing model.

BRIEF DESCRIPTION OF DRAWINGS

The preceding and other features, advantages, and aspects of the embodiments of the present disclosure will become more apparent with reference to the following specific implementations thereof in conjunction with the drawings. Same or similar reference numerals in the drawings denote same or similar elements. It is to be understood that the drawings are illustrative and that originals and elements are not necessarily drawn to scale.

DETAILED DESCRIPTION

Figure 1:
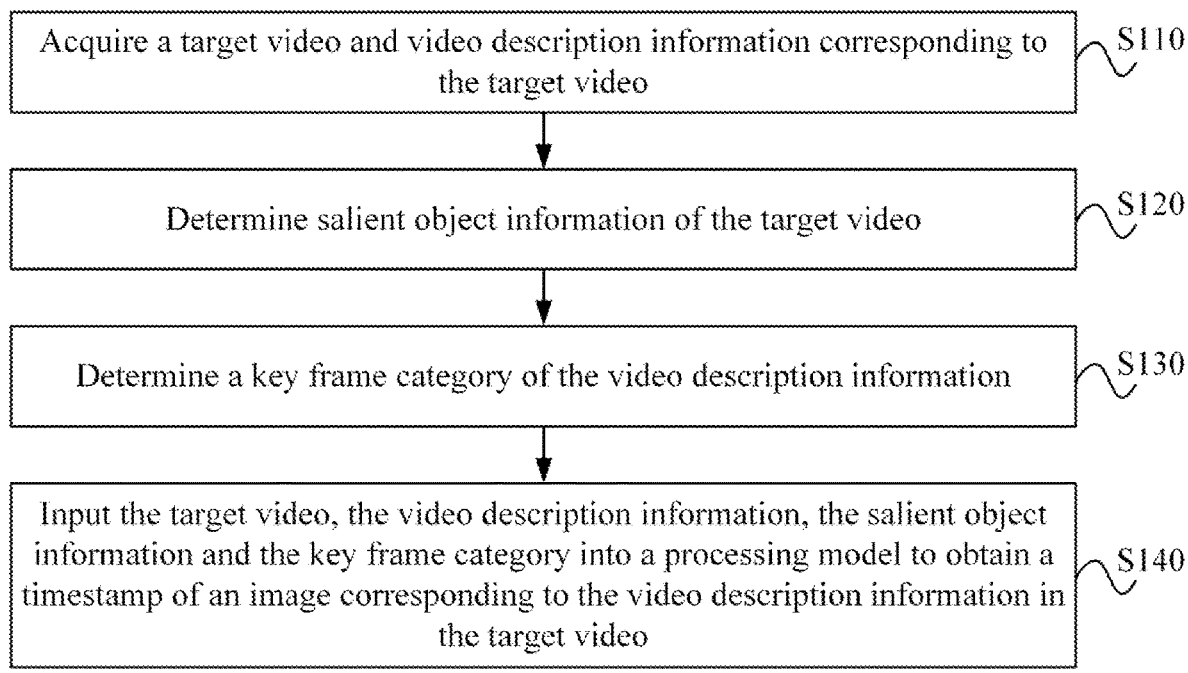
FIG. 1 is a flowchart of a processing method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It should be understood that the drawings and embodiments of the present disclosure are merely illustrative and are not intended to limit the scope of the present disclosure.

It should be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

Optional features and examples are provided in each of the multiple embodiments described below. Multiple features described in the embodiments may be combined to form multiple optional solutions. Each numbered embodiment should not be regarded as only one solution. Additionally, if not in collision, the embodiments in the present disclosure and the features thereof may be combined with each other.

Embodiment One

FIG. 1 is a flowchart of a processing method according to embodiment one of the present disclosure. The method is applicable to the case of processing a video and may be implemented by a processing apparatus. The apparatus may be implemented by software and/or hardware and is generally integrated on a terminal device. In the embodiment, the terminal device includes but is not limited to: a computer, a laptop, a tablet and/or a mobile phone.

As shown in FIG. 1, the processing method provided in embodiment one of the present disclosure includes steps described below.

In S110, a target video and video description information corresponding to the target video are acquired.

The target video may refer to a to-be-processed video, such as a video on which a highlight frame analysis or a highlight clip analysis needs to be performed. A highlight frame may be considered as a video frame capable of reflecting important information in the video. A highlight clip may be considered as a video clip reflecting important information in the video. The target video may be an original video or a certain video clip in the original video, and the original video may be a to-be-processed original video, such as a video that has been shot but not edited, or a video that has undergone preliminary processing (such as cropping, adding titles and subtitles, etc.) after shot. A video clip may be a clip obtained after the original video is divided into chapters, also referred to as a video slice. The video description information may be understood as a brief description of the target video, and is used for characterizing the main content of the target video.

In this embodiment, the target video and the video description information corresponding to the target video may be acquired for subsequent processing. The embodiment does not limit the manner for acquiring the target video and the video description information. For example, the processing method may be applied to a video presentation application program; the target video may be an original video acquired from a service terminal, or may be a video obtained by cropping the entire original video including multiple video clips into a certain video clip; the video description information may be obtained based on the analysis on the text and/or images appearing in the target video, which are not limited by the embodiment.

In S120, salient object information of the target video is determined.

The salient object information may be referred to as information characterizing the salient object in the target video, and the salient object may be the object in the target video. For example, the salient object information may include persons, animals, plants, and/or things. For example, if the target video is a video of food tasting, the salient object information may be persons, food and the like appearing in the video.

Specifically, after the target video is acquired, the salient object information of the target video may be determined, and the manner for determining the salient object information is not limited here. For example, the salient object information in the target video may be identified by performing frame extraction processing on the target video and then analyzing the video frame; or the salient object information of the target video may be determined based on the category of the salient object. The manner for determining the category of the salient object is not limited. The category of the salient object may be determined based on the category of the target video or may be preset. The salient object information of the target video may also be determined through a trained model.

In S130, a key frame category of the video description information is determined.

The key frame category may be understood as the type of a key frame in the target video, and may be determined according to the video description information corresponding to the target video. For example, when the video description information is that a blogger is tasting pickled cabbage with streaky pork, then the key frame category may be a food category or a tasting category, and which category the key frame specifically belongs to is determined based on actual requirements; when the video description information is that a blogger is trying various down clothes on, the key frame category may be a clothing category or a try-on category. The specific means for determining the key frame category is not limited. For example, the video description information may be input into a key frame category prediction model to determine the key frame category of the video description information. The training process of the key frame category prediction model is not expanded on in this step. For example, the key frame category prediction model may be obtained by pre-training through a large amount of video description information and corresponding key frame categories.

In S140, the target video, the video description information, the salient object information and the key frame category are input into a processing model to obtain a timestamp of an image corresponding to the video description information in the target video.

The processing model may be considered as a model for outputting the timestamp of a highlight frame or a highlight clip according to input information. In the embodiment, the input information may include the target video, the video description information, the salient object information, the key frame category, etc. The processing model may be obtained by pre-training, and the process of training may include steps described below. The target video, the video description information, the salient object information and the key frame category in the training stage are input into the processing model first, a matching score corresponding to each frame of the image in the target video is output, then the timestamp corresponding to the highest matching score is compared with a timestamp manually pre-marked to correct parameters of the processing model, and until the timestamp corresponding to the highest matching score is the same as the timestamp manually pre-marked or the probability that the highest matching score is the same as the timestamp manually pre-marked is greater than a certain value, the training may be ended.

The image corresponding to the video description information in the target video may be understood as a certain image (which may be considered as a highlight frame) in the target video having the maximum relevance to the video description information, and one or more images corresponding to the video description information may exist. It is to be understood that the image corresponding to the video description information in the target video may show a highlight moment in the target video or may be an image interesting viewers in the target video, etc. The timestamp of the image corresponding to the video description information in the target video may refer to time data corresponding to the image, which is used for identifying when the image is displayed in the target video. For example, if the target video has the duration of 5 minutes, the timestamp may be at the first minute, that is, the image selected from the target video is located at the first minute.

In this step, the target video, the video description information, the salient object information and the key frame category may be input into the processing model for processing to obtain the timestamp of the image corresponding to the video description information in the target video, where the specific processing process is not limited. The processing model may be an entire model, and can directly output the timestamp of the image according to the input information; the processing model may also include multiple modules, and each module can separately process the input information and then synthesize the processed information to obtain the timestamp of the image corresponding to the video description information in the target video.

Exemplarily, the target video may first be input to a first information extraction module in the processing model to extract image information and first text information in the target video; then the video description information is input into a second information extraction module in the processing model to extract second text information in the video description information; finally, the timestamp of the image corresponding to the video description information in the target video can be comprehensively determined according to the salient object information, the image information, the first text information, the second text information and the key frame category.

According to the processing method provided by embodiment one of the present disclosure, a target video and video description information corresponding to the target video are acquired; salient object information of the target video is determined; a key frame category of the video description information is determined; and the target video, the video description information, the salient object information and the key frame category are input into a processing model to obtain a timestamp of an image corresponding to the video description information in the target video. Through the preceding method, the salient object information and the key frame category can be determined according to the target video, so that the processing of the video is assisted in through the salient object information and the key frame category, and the accuracy of the output timestamp is improved after the video description information and the target video are input into the processing model.

On the basis of the preceding embodiment, variant embodiments of the preceding embodiment are proposed, and it is to be noted that here, for the brevity of description, only differences from the preceding embodiment are described in the variant embodiments.

In an embodiment, the step in which the salient object information of the target video is determined includes steps described below.

Sparse frame extraction processing is performed on the target video to obtain a second target object.

Salient object information corresponding to the second target object is determined.

The second target object may be understood as an object obtained after the sparse frame extraction processing is performed on the target video. The sparse frame extraction may refer to a processing manner of extracting at least one frame of image at certain-frame intervals, that is, the second target object may be a frame, or may be a video clip formed by connecting frames, which is not limited in the embodiment.

In an embodiment, the second target object includes a frame and/or a video clip.

The frame may be considered as an image screen formed in units of frames. The video clip may refer to a clip composed of multiple frames of images, and the specific composition manner is not further expanded on here.

In the embodiment, the sparse frame extraction processing may be performed on the target video first to obtain the second target object, and the step of obtaining the second target object is not limited. For example, after the target video is subjected to the video decoding, frame color space conversion and Joint Photographic Experts Group (JPEG) encoding, the JPEG image is stored on the disk as the second target object. After the second target object is obtained, the corresponding salient object information in the second target object can be determined.

In an embodiment, the salient object information of the second target object may be determined by a model. For example, the second target object is input into an identification model to determine the salient object information of the second target object.

In an embodiment, the determination of the second target object and the determination of the salient object information may both be implemented by a model. For example, the target object is input into a model to obtain the corresponding salient object information.

In an embodiment, the step in which the key frame category of the video description information is determined includes steps described below.

The video description information is input into a key frame category prediction model to obtain the corresponding key frame category.

The key frame category prediction model may be a model for predicting the key frame category according to input information. In the embodiment, the key frame category prediction model may be obtained through the pre-training by the system or relevant personnel, and the timing of the training is not limited. The training may be performed before the video description information corresponding to the target video is acquired, or may be performed after the video description information corresponding to the target video is acquired, as long as the key frame category of the video description information can be obtained.

Embodiment Two

Figure 2:
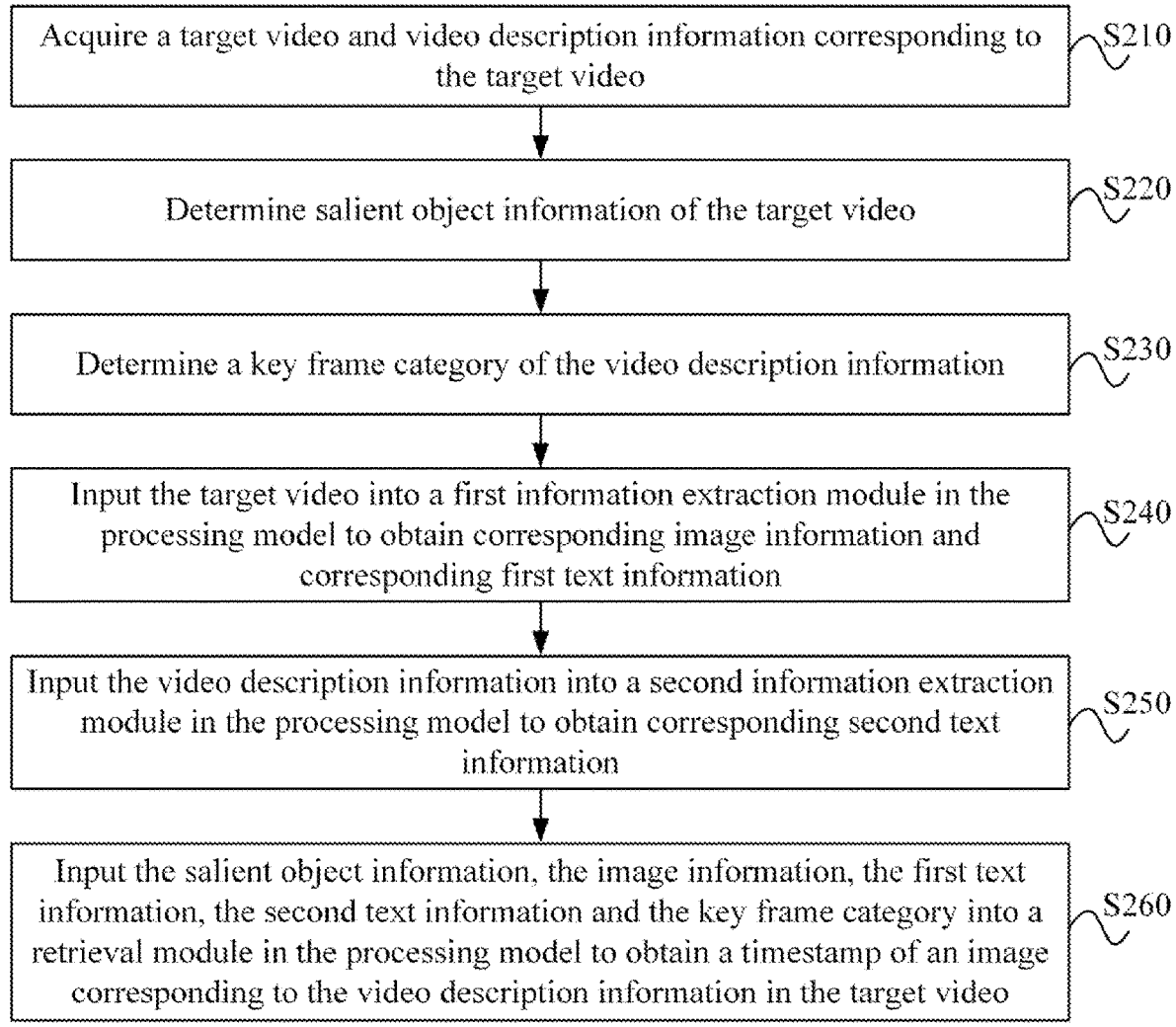
FIG. 2 is a flowchart of a processing method according to embodiment two of the present disclosure.

FIG. 2 is a flowchart of a processing method according to embodiment two of the present disclosure. Embodiment two is specified based on the optional solutions in the preceding embodiment. In the embodiment, the step in which the target video, the video description information, the salient object information and the key frame category are input into the processing model to obtain the timestamp of the image corresponding to the video description information in the target video is further specified as steps described below. The target video is input into a first information extraction module in the processing model to obtain corresponding image information and corresponding first text information; the video description information is input into a second information extraction module in the processing model to obtain corresponding second text information; and the salient object information, the image information, the first text information, the second text information and the key frame category are input into a retrieval module in the processing model to obtain the timestamp of the image corresponding to the video description information in the target video.

For the content not detailed in the embodiment, reference may be made to embodiment one.

As shown in FIG. 2, the processing method provided in embodiment two of the present disclosure includes steps described below.

In S210, a target video and video description information corresponding to the target video are acquired.

In S220, salient object information of the target video is determined.

In S230, a key frame category of the video description information is determined.

In S240, the target video is input into a first information extraction module in the processing model to obtain corresponding image information and corresponding first text information.

The first information extraction module may be included in the processing model for extracting the image information and the first text information of the target video input into the processing model. The image information may be a visual feature of each frame of image in the target video, for example, may include a person feature, a color feature, etc. The first text information may refer to a text description added to the target video, for example, may be commentary text, dialogues, explanatory words and/or subtitles.

Specifically, the target video may be input into the first information extraction module to obtain the corresponding image information and the corresponding first text information. The specific means for obtaining the image information and the specific means for obtaining the first text information are not limited, and may be the same or different.

Exemplarily, the image information and the first text information corresponding to the target video may be output directly according to the first information extraction module; or the first text information may be obtained by performing text extraction on subtitle information in the target video according to the first information extraction module, and the image information may be obtained by performing frame image recognition on the target video according to the first information extraction module, which is not limited in this step.

In S250, the video description information is input into a second information extraction module in the processing model to obtain corresponding second text information.

The second information extraction module may be included in the processing model for extracting the second text information of the video description information input into the processing model. The second text information may refer to the text feature of the video description information. It is to be noted that the first text information and the second text information are only used for distinguishing between different objects and are not limited in the embodiment.

In the embodiment, the video description information may be directly input into the second information extraction module in the processing model to obtain the corresponding second text information for processing in subsequent steps.

In S260, the salient object information, the image information, the first text information, the second text information and the key frame category are input into a retrieval module in the processing model to obtain a timestamp of an image corresponding to the video description information in the target video.

The retrieval module may be understood as a module for performing retrieval according to input information, and is used for performing moment localization of an image.

In this step, the salient object information, the image information, the first text information, the second text information and the key frame category obtained in the preceding steps may be input together into the retrieval module in the processing model to perform information matching and selection, so as to obtain the timestamp of the image corresponding to the video description information in the target video. For example, a video-related feature may be matched to a description-related feature, and a frame or video clip matching the description-related feature is selected from the target video. The video-related feature includes: the salient object information, the image information and the first text information. The description-related feature includes: the second text information and the key frame category. When the frame or video clip matching the description-related feature is selected from the target video, the timestamp of the image having the highest matching degree or the matching degree greater than a set value may be selected according to a matching result as the timestamp of the image corresponding to the video description information in the target video.

According to the processing method provided by embodiment two of the present disclosure, the image information and the first text information corresponding to the target video are obtained according to the first information extraction module in the processing model, the second text information corresponding to the video description information is obtained according to the second information extraction module in the processing model, and the video-related feature is matched to the description-related feature, so that the accuracy of the obtained timestamp of the image is further improved.

In an embodiment, the step in which the target video is input into the first information extraction module in the processing model to obtain the corresponding image information and the corresponding first text information includes steps described below.

After the target video is input into the first information extraction module in the processing model, a first target object of the target video is obtained through sparse frame extraction.

Image information extraction is performed on the first target object to obtain the corresponding image information.

Subtitle information of the target video is extracted.

Text information extraction is performed on the subtitle information to obtain the corresponding first text information.

In the embodiment, the first target object may be understood as an object obtained after the sparse frame extraction processing is performed on the target video. The first target object may be the same as or different from a second target object, and the specific extraction manners may be different. The first target object includes a frame or a video clip. The subtitle information may refer to a text description added in the target video, and may be located at a blank area of the target video, such as the bottom area, the right area, etc.

Specifically, the image information extraction may be performed on the first target object through the first information extraction module to obtain the corresponding image information; and then the subtitle information of the target video is extracted through the first information extraction module and the text information extraction is performed on the subtitle information to obtain the corresponding first text information. The text information extraction may be achieved by performing character recognition on the subtitle information and may be calibrated in combination with speech recognition on the target video to obtain the first text information, which is not limited in the embodiment.

In an embodiment, the step in which the salient object information, the image information, the first text information, the second text information and the key frame category are input into the retrieval module in the processing model to obtain the timestamp of the image corresponding to the video description information in the target video includes steps described below.

The salient object information, the image information, the first text information, the second text information and the key frame category are input into the retrieval module in the processing model to obtain multiple candidate timestamps and corresponding matching degrees.

The timestamp of the image corresponding to the video description information in the target video is determined according to the matching degrees of the candidate timestamps.

The multiple candidate timestamps may refer to timestamps of multiple candidate images corresponding to the video description information in the target video, and the corresponding matching degrees are matching scores of the multiple candidate images and the video description information and are used for characterizing the matching degrees between the images and the video description information. The larger the matching score is, the better the matching degree between the image and the video description information.

Specifically, the multiple candidate images may be subjected to initial selection through the retrieval module in the processing model first, and the step of selection may be set by the system, for example, the candidate images must belong to the key frame category of the video description information, or the salient object characterized by the salient object information appears in the candidate images, or the candidate images are associated with the second text information, etc.; and then a candidate timestamp and a matching degree corresponding to each candidate image are output, so as to determine the timestamp of the final image corresponding to the video description information in the target video.

Finally, the timestamp of the image corresponding to the video description information in the target video may be determined according to the matching degree corresponding to each candidate image, and specifically may be determined according to the matching scores. Exemplarily, the matching scores corresponding to the various candidate images may be sequenced, and then the timestamp of the image corresponding to the highest matching degree is selected as the timestamp of the image corresponding to the video description information in the target video; or a threshold may be used for determination, that is, the timestamp greater than the threshold is used as the timestamp of the image corresponding to the video description information in the target video.

Figure 3:
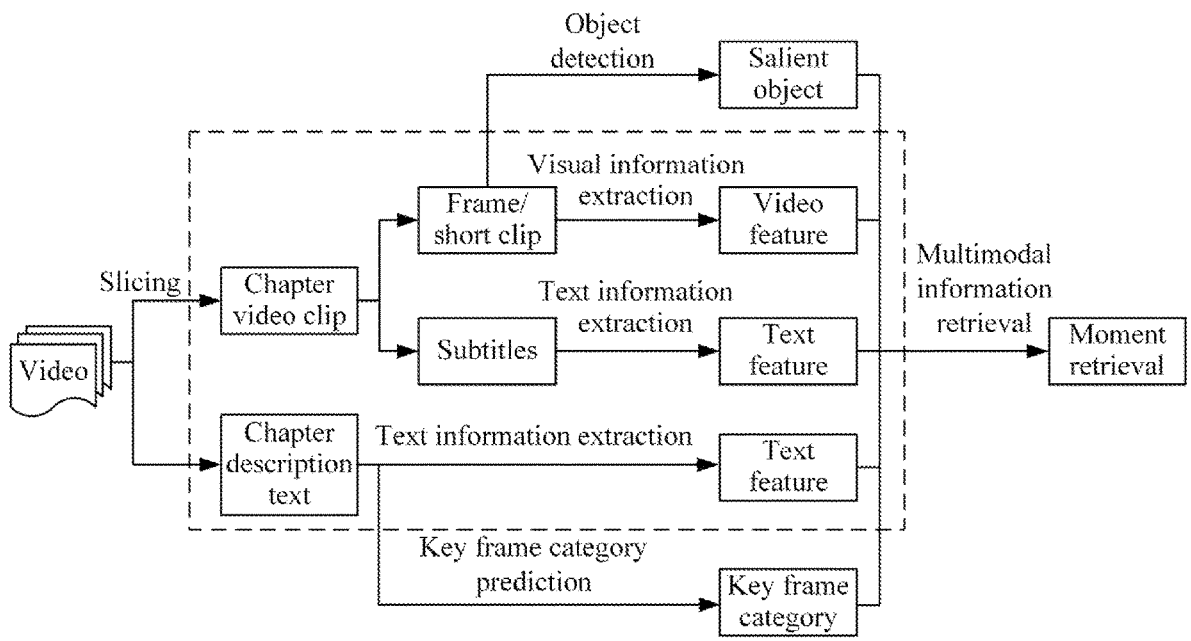
FIG. 3 is a flowchart of a processing method according to embodiment two of the present disclosure.

FIG. 3 is a flowchart of a processing method according to embodiment two of the present disclosure. As shown in FIG. 3, the processing method provided by the embodiment can implement the extraction of the highlight moment of a video and mainly involves two parts: multimodal information extraction (that is, the part in the dotted line box in the figure, corresponding to the first information extraction module and the second information extraction module) and multimodal information retrieval (that is, corresponding to the retrieval module).

The inputs of the multimodal information extraction part are a chapter video clip (that is, the target video) and a chapter text description (that is, the video description information). After various pre-processing algorithms such as sparse frame extraction and subtitle extraction are performed on the chapter video clip, a frame/video clip (that is, a frame/short clip, corresponding to the first target object) and subtitles (that is, the subtitle information) are obtained, and then after the processing such as object detection and visual/text information extraction is performed, multimodal features of the chapter video clip is generated and include: a salient object, a video feature and a text feature (that is, the salient object information, the image information and the first text information). After the chapter text description is subjected to text information extraction (that is, the processing by the second information extraction module) and is processed by the key frame category prediction model, a chapter description text feature (that is, the second text information) and the predicted key frame category are obtained.

The multimodal information retrieval part is an information retrieval model (that is, the retrieval module), obtains a matching score (that is, the multiple candidate timestamps and the corresponding matching degrees) of each frame/short clip of each chapter video clip and the chapter text description according to the input of matching multimodal information (that is, the target video, the video description information, the salient object information and the key frame category), and then returns the frame/clip having the highest matching degree as a moment retrieval result (that is, the timestamp of the image corresponding to the video description information in the target video) after matching scores are sequenced.

It can be seen from the preceding description that in the processing method provided by the embodiment, one or more images corresponding to chapter description information may be selected from each chapter as a summary of the chapter. The main method used is a moment localization algorithm, that is, a clip of target video and corresponding text (that is, the video description information) are input, and the timestamp of the most representative clip in the video can be returned.

In the processing method provided by the embodiment, multiple pieces of information such as the salient object, the visual feature and the text feature are extracted from the target video for moment localization, while in the related processing method, only visual information is used for moment localization, and thus the accuracy is relatively low. Meanwhile, the key frame/moment provided in the embodiment is clearly defined, and the processing model can assist in locating the highlight area based on the video type and the category of the predicted key frame/moment in the video description information, so that the interpretability of the finally-obtained highlight area is improved.

Embodiment Three

Figure 4:
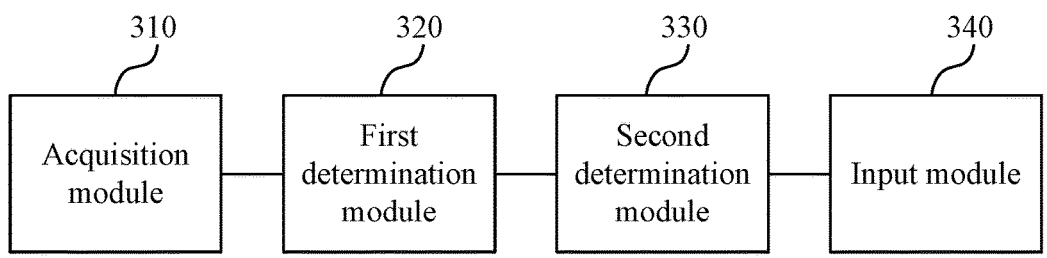
FIG. 4 is a structural diagram of a processing apparatus according to embodiment three of the present disclosure.

FIG. 4 is a structural diagram of a processing apparatus according to embodiment three of the present disclosure. The apparatus is applicable to the case of processing a video. The apparatus may be implemented by software and/or hardware and is generally integrated on a terminal device.

As shown in FIG. 4, the apparatus includes an acquisition module 310, a first determination module 320, a second determination module 330 and an input module 340.

The acquisition module 310 is configured to acquire a target video and video description information corresponding to the target video.

The first determination module 320 is configured to determine salient object information of the target video.

The second determination module 330 is configured to determine a key frame category of the video description information.

The input module 340 is configured to input the target video, the video description information, the salient object information and the key frame category into a processing model to obtain a timestamp of an image corresponding to the video description information in the target video.

In the embodiment, the apparatus acquires a target video and video description information corresponding to the target video through the acquisition module 310; determines salient object information of the target video through the first determination module 320; determines a key frame category of the video description information through the second determination module 330; and inputs the target video, the video description information, the salient object information and the key frame category into a processing model to obtain a timestamp of an image corresponding to the video description information in the target video through the input module 340. Through this apparatus, the salient object information and the key frame category can be determined according to the target video, so that the processing of the video is assisted in through the salient object information and the key frame category, and the accuracy of the output timestamp is improved after the video description information and the target video are input into the processing model.

Further, the input module 340 includes a first input unit, a second input unit and a third input unit.

The first input unit is configured to input the target video into a first information extraction module in the processing model to obtain corresponding image information and corresponding first text information.

The second input unit is configured to input the video description information into a second information extraction module in the processing model to obtain corresponding second text information.

The third input unit is configured to input the salient object information, the image information, the first text information, the second text information and the key frame category into a retrieval module in the processing model to obtain the timestamp of the image corresponding to the video description information in the target video.

Further, the first input unit involves steps described below.

After the target video is input into the first information extraction module in the processing model, a first target object of the target video is obtained through sparse frame extraction.

Image information extraction is performed on the first target object to obtain the corresponding image information.

Subtitle information of the target video is extracted.

Text information extraction is performed on the subtitle information to obtain the corresponding first text information.

Further, the third input unit involves steps described below.

The salient object information, the image information, the first text information, the second text information and the key frame category are input into the retrieval module in the processing model to obtain multiple candidate timestamps and corresponding matching degrees.

The timestamp of the image corresponding to the video description information in the target video is determined according to the matching degrees of the candidate timestamps.

Further, the first determination module 320 involves steps described below.

Sparse frame extraction processing is performed on the target video to obtain a second target object.

Salient object information corresponding to the second target object is determined.

Further, the second target object includes a frame and/or a video clip.

Further, the second determination module 320 involves the step described below.

The video description information is input into a key frame category prediction model to obtain the corresponding key frame category.

The preceding processing apparatus may execute the processing method provided by any embodiment of the present disclosure, and has functional modules and beneficial effects corresponding to the executed method.

Embodiment Four

Figure 5:
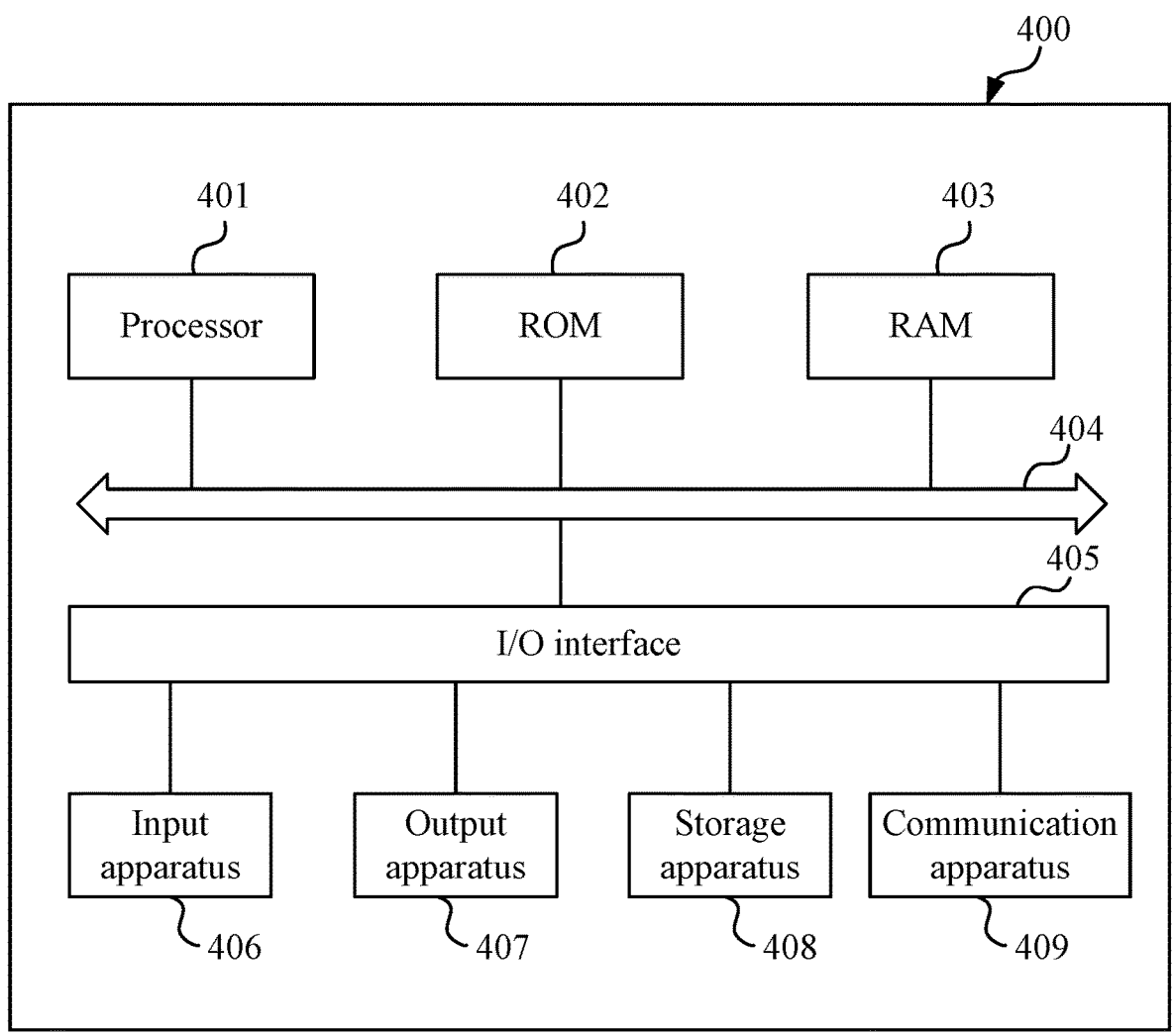
FIG. 5 is a structural diagram of a terminal device according to embodiment four of the present disclosure.

FIG. 5 is a structural diagram of a terminal device according to embodiment four of the present disclosure. FIG. 5 illustrates the structure of the terminal device 400 applicable to implementing the embodiments of the present disclosure. The terminal device 400 in the embodiment of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The terminal device 400 shown in FIG. 5 is merely an example and is not intended to limit the function and usage scope of the embodiment of the present disclosure.

As shown in FIG. 5, the terminal device 400 may include one or more processors (such as a central processing unit, a graphics processing unit) 401. The processors 400 may execute various appropriate actions and processing according to a program stored in a read-only memory (ROM) 402 or a program loaded into a random-access memory (RAM) 403 from a storage apparatus 408. The one or more processors 401 implement the processing method provided by the present disclosure. Various programs and data required for the operation of the terminal device 400 are also stored in the RAM 403. The processors 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer and a gyroscope; an output apparatus 407 such as a liquid crystal display (LCD), a speaker and a vibrator; the storage apparatus 408, configured to store one or more programs, such as a magnetic tape and a hard disk; and a communication apparatus 409. The communication apparatus 409 may allow the terminal device 400 to perform wireless or wired communication with other devices to exchange data. Although FIG. 5 shows the terminal device 400 having various apparatuses, it is to be understood that not all of the apparatuses shown here need to be implemented or present. Alternatively, more or fewer apparatuses may be implemented or present.

Particularly, according to the embodiments of the present disclosure, the process described above with reference to the flowcharts may be implemented as a computer software program. For example, the embodiment of the present disclosure includes a computer program product. The computer program product includes a computer program carried in a computer-readable medium. The computer program includes program codes for executing the method shown in the flowcharts. In such an embodiment, the computer program may be downloaded from a network and installed through the communication apparatus 409, or may be installed from the storage apparatus 408, or may be installed from the ROM 402. When the computer program is executed by the processors 401, the preceding functions defined in the method of the embodiments of the present disclosure are executed.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection having one or more wires, a portable computer magnetic disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as the Hypertext Transfer Protocol (HTTP), and may be interconnected with digital data communication (for example, a communication network) in any form or medium. Examples of the communication network include a local area network (LAN), a wide area network (WAN), an internet (such as the Internet) and a peer-to-peer network (such as an Ad-Hoc network), as well as any network currently known or to be developed in the future.

The computer-readable medium may be included in the preceding terminal device or may exist alone without being assembled into the terminal device 400.

The preceding computer-readable medium stores one or more computer programs which, when executed by a processor, execute the method described below.

A target video and video description information corresponding to the target video are acquired.

Salient object information of the target video is determined.

A key frame category of the video description information is determined.

The target video, the video description information, the salient object information and the key frame category are input into a processing model to obtain a timestamp of an image corresponding to the video description information in the target video.

The preceding computer-readable medium carries one or more programs. When the preceding one or more programs are executed by the terminal device 400, for the terminal device 400, computer program codes for executing the operations of the present disclosure may be written in one or more programming languages or a combination thereof, the programming languages including object-oriented programming languages such as Java, Smalltalk and C++ and further including conventional procedural programming languages such as C programming language or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or may be connected to an external computer (for example, via the Internet provided by an Internet service provider).

The flowcharts and block diagrams in the drawings show the possible architecture, function and operation of the system, method and computer program product according to various embodiments of the present disclosure. Each block in the flowcharts or block diagrams may represent a module, a program segment or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The described modules involved in the embodiments of the present disclosure may be implemented in software or in hardware. The name of a module is not intended to limit the module in a certain circumstance.

The functions described above herein may be executed, at least partially, by one or more hardware logic components. For example, without limitations, exemplary types of hardware logic components that may be used include a field programmable gate array (FPGA), an application-specific integrated circuit (ASIC), an application specific standard product (ASSP), a system on a chip (SoC), and a complex programmable logic device (CPLD).

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, example 1 provides a processing method including steps described below.

A target video and video description information corresponding to the target video are acquired.

Salient object information of the target video is determined.

A key frame category of the video description information is determined.

The target video, the video description information, the salient object information and the key frame category are input into a processing model to obtain a timestamp of an image corresponding to the video description information in the target video.

According to one or more embodiments of the present disclosure, in example 2, according to the method of example 1, the step in which the target video, the video description information, the salient object information and the key frame category are input into the processing model to obtain the timestamp of the image corresponding to the video description information in the target video includes steps described below.

The target video is input into a first information extraction module in the processing model to obtain corresponding image information and corresponding first text information.

The video description information is input into a second information extraction module in the processing model to obtain corresponding second text information.

The salient object information, the image information, the first text information, the second text information and the key frame category are input into a retrieval module in the processing model to obtain the timestamp of the image corresponding to the video description information in the target video.

According to one or more embodiments of the present disclosure, in example 3, according to the method of example 2, the step in which the target video is input into the first information extraction module in the processing model to obtain the corresponding image information and the corresponding first text information includes steps described below.

After the target video is input into the first information extraction module in the processing model, a first target object of the target video is obtained through sparse frame extraction.

Image information extraction is performed on the first target object to obtain the corresponding image information.

Subtitle information of the target video is extracted.

Text information extraction is performed on the subtitle information to obtain the corresponding first text information.

According to one or more embodiments of the present disclosure, in example 4, according to the method of example 2, the step in which the salient object information, the image information, the first text information, the second text information and the key frame category are input into the retrieval module in the processing model to obtain the timestamp of the image corresponding to the video description information in the target video includes steps described below.

The salient object information, the image information, the first text information, the second text information and the key frame category are input into the retrieval module in the processing model to obtain multiple candidate timestamps and corresponding matching degrees.

The timestamp of the image corresponding to the video description information in the target video is determined according to the matching degrees of the candidate timestamps.

According to one or more embodiments of the present disclosure, in example 5, according to the method of example 1, the step in which the salient object information of the target video is determined includes steps described below.

Sparse frame extraction processing is performed on the target video to obtain a second target object.

Salient object information corresponding to the second target object is determined.

According to one or more embodiments of the present disclosure, in example 6, according to the method of example 5, the second target object includes a frame and/or a video clip.

According to one or more embodiments of the present disclosure, in example 7, according to the method of example 1, the step in which the key frame category of the video description information is determined includes the step described below.

The video description information is input into a key frame category prediction model to obtain the corresponding key frame category.

According to one or more embodiments of the present disclosure, example 8 provides a processing apparatus. The processing apparatus includes an acquisition module, a first determination module, a second determination module and an input module.

The acquisition module is configured to acquire a target video and video description information corresponding to the target video.

The first determination module is configured to determine salient object information of the target video.

The second determination module is configured to determine a key frame category of the video description information.

The input module is configured to input the target video, the video description information, the salient object information and the key frame category into a processing model to obtain a timestamp of an image corresponding to the video description information in the target video.

According to one or more embodiments of the present disclosure, example 9 provides a terminal device. The terminal device includes one or more processors and a storage apparatus configured to store one or more programs.

The one or more programs, when executed by the one or more processors, cause the one or more processors to implement the method according to any one of example 1 to example 7.

According to one or more embodiments of the present disclosure, example 10 provides a computer-readable medium storing a computer program. The computer program, when executed by a processor, implements the method according to any one of example 1 to example 7.

The preceding description is merely illustrative of preferred embodiments of the present disclosure and the technical principles used therein. Those skilled in the art should understand that the scope referred to in the disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding features and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable subcombination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A processing method, comprising:
   acquiring a target video and video description information of the target video;
   determining salient object information of the target video;
   extracting at least one key frame from the target video according to the video description information, and determining a category of each key frame of the at least one key frame;
   inputting the target video into a first information extraction module in the processing model to obtain image information and first text information of the target video;
   inputting the video description information into a second information extraction module in the processing model to obtain second text information of the target video, wherein the salient object information, the image information and the first text information are video-related features and the second text information and the category of each key frame are description-related features;
   inputting the video-related features and the description-related features into the retrieval module in the processing model to perform matching processes on the video-related features and the description-related features to obtain, from the target video, frames matching the description-related features, candidate timestamps of the frames, and matching degrees of the frames to the description-related features; and
   determining a timestamp of an image corresponding to the video description information in the target video according to the matching degrees corresponding to the plurality of candidate timestamps.

2. The method according to claim 1, wherein inputting the target video into the first information extraction module in the processing model to obtain the image information and the first text information of the target video comprises:
   after inputting the target video into the first information extraction module in the processing model, obtaining a first target object of the target video through sparse frame extraction;
   performing image information extraction on the first target object to obtain the image information;
   extracting subtitle information of the target video; and
   performing text information extraction on the subtitle information to obtain the first text information.

3. The method according to claim 1, wherein determining the salient object information of the target video comprises:
   performing sparse frame extraction processing on the target video to obtain a second target object; and
   determining salient object information corresponding to the second target object.

4. The method according to claim 3, wherein the second target object comprises a frame and/or a video clip.

5. The method according to claim 1, wherein determining the category of each key frame comprises:
   inputting the video description information into a key frame category prediction model to obtain the category of each key frame.

6. A processing apparatus, comprising:
   one or more processors; and
   a storage apparatus configured to store one or more programs;

wherein the one or more programs, when executed by the one or more processors, cause the one or more processors to implement:

acquiring a target video and video description information of the target video;

determining salient object information of the target video;

extracting at least one key frame from the target video according to the video description information, and determining a category of each key frame of the at least one key frame;

inputting the target video into a first information extraction module in the processing model to obtain image information and first text information of the target video;

inputting the video description information into a second information extraction module in the processing model to obtain second text information of the target video, wherein the salient object information, the image information and the first text information are video-related features and the second text information and the category of each key frame are description-related features;

inputting the video-related features and the description-related features into the retrieval module in the processing model to perform matching processes on the video-related features and the description-related features to obtain, from the target video, frames matching the description-related features, candidate timestamps of the frames, and matching degrees of the frames to the description-related features; and determining a timestamp of an image corresponding to the video description information in the target video according to the matching degrees corresponding to the plurality of candidate timestamps.

7. The apparatus according to claim 6, wherein the one or more processors inputs the target video into the first information extraction module in the processing model to obtain the image information and the first text information by:

after inputting the target video into the first information extraction module in the processing model, obtaining a first target object of the target video through sparse frame extraction;

performing image information extraction on the first target object to obtain the image information;

extracting subtitle information of the target video; and performing text information extraction on the subtitle information to obtain the first text information.

8. The apparatus according to claim 6, wherein the one or more processors determines the salient object information of the target video by:

performing sparse frame extraction processing on the target video to obtain a second target object; and determining salient object information corresponding to the second target object.

9. The apparatus according to claim 8, wherein the second target object comprises a frame and/or a video clip.

10. The apparatus according to claim 6, wherein the one or more processors determines the category of each key frame comprises:

inputting the video description information into a key frame category prediction model to obtain the category of each key frame.

11. A non-transitory computer-readable storage medium storing a computer program which, when executed by a processor, implements:

acquiring a target video and video description information corresponding to the target video;

determining salient object information of the target video;

extracting at least one key frame from the target video according to the video description information, and determining a category of each key frame of the at least one key frame;

inputting the target video into a first information extraction module in the processing model to obtain image information and first text information of the target video;

inputting the video description information into a second information extraction module in the processing model to obtain second text information of the target video, wherein the salient object information, the image information and the first text information are video-related features and the second text information and the category of each key frame are description-related features;

inputting the video-related features and the description-related features into the retrieval module in the processing model to perform matching processes on the video-related features and the description-related features to obtain, from the target video, frames matching the description-related features, candidate timestamps of the frames, and matching degrees of the frames to the description-related features; and determining a timestamp of an image corresponding to the video description information in the target video according to the matching degrees corresponding to the plurality of candidate timestamps.

12. The non-transitory computer-readable storage medium according to claim 11, wherein the computer program inputs the target video into the first information extraction module in the processing model to obtain the image information and the first text information by:

after inputting the target video into the first information extraction module in the processing model, obtaining a first target object of the target video through sparse frame extraction;

performing image information extraction on the first target object to obtain the image information;

extracting subtitle information of the target video; and performing text information extraction on the subtitle information to obtain the first text information.

13. The non-transitory computer-readable storage medium according to claim 11, wherein the computer program determines the salient object information of the target video by:

performing sparse frame extraction processing on the target video to obtain a second target object; and determining salient object information corresponding to the second target object.

14. The non-transitory computer-readable storage medium according to claim 13, wherein the second target object comprises a frame and/or a video clip.

* * * * *